US007168571B2

(12) United States Patent
Gerteis et al.

(10) Patent No.: US 7,168,571 B2
(45) Date of Patent: Jan. 30, 2007

(54) INVERTING-FILTER CENTRIFUGE

(76) Inventors: Johannes Gerteis, Ruländerveg 7, 74321 Bietigheim-Bissingen (DE); Gerd Mayer, Richard-Duschek-Strasse 8, 74354 Besigheim (DE)

( * ) Notice: Subject to any disclaimer, the term of this patent is extended or adjusted under 35 U.S.C. 154(b) by 0 days.

(21) Appl. No.: 10/549,361

(22) PCT Filed: Mar. 4, 2004

(86) PCT No.: PCT/DE2004/000408

§ 371 (c)(1),
(2), (4) Date: Sep. 14, 2005

(87) PCT Pub. No.: WO2004/082843

PCT Pub. Date: Sep. 30, 2004

(65) Prior Publication Data

US 2006/0175245 A1 Aug. 10, 2006

(30) Foreign Application Priority Data

Mar. 19, 2003 (DE) ................................ 103 11 997

(51) Int. Cl.
*B04B 3/02* (2006.01)
*B01D 33/11* (2006.01)
*B01D 33/44* (2006.01)

(52) U.S. Cl. .................... 210/372; 210/376; 210/380.3

(58) Field of Classification Search ................ 210/369, 210/372, 376, 380.1, 380.3
See application file for complete search history.

(56) References Cited

U.S. PATENT DOCUMENTS 5,304,306 A * 4/1994 Gerteis .................... 210/380.3

(Continued)

FOREIGN PATENT DOCUMENTS

EP 0551252 * 7/1993

(Continued)

*Primary Examiner*—Fred G. Prince
(74) *Attorney, Agent, or Firm*—Browdy and Neimark, PLLC

(57) ABSTRACT

The invention relates to an inverting filter centrifuge comprising a filter drum (16) that is rotatably mounted in a machine frame and projects in a cantilevered manner into a housing that is connected to the machine frame, said drum radially surrounding a centrifugal chamber (14) that can be subjected to an excess or negative pressure. The centrifugal chamber (14) is sealed on one end face by a centrifugal chamber cover (25) and on the other face by a sliding base (23). The filter drum (16), the centrifugal chamber cover (25) and the sliding base (23), together with a sliding shaft (12) that is connected in a fixed manner to the latter are driven by a hollow shaft (3) that causes them to rotate in unison. The filter drum (16) and the sliding base (23) are moved in relation to one another by an axial displacement of the sliding shaft (12), said action inverting a filter cloth (22) and discharging the separated solid matter from the centrifugal chamber (14). The centrifuge is provided with a passage for the media that is to be introduced into the rotating chamber, said passage running from the sliding base side via the sliding shaft to a radially static inlet channel (26) and removing the need for seals in the centrifugal chamber (14) and the solid matter collection chamber (32). The lack of abraded particles achieved by the absence of seals in the sensitive centrifugal chamber and solid matter collection chamber eliminates the risk of contamination. The optimal configuration for a clean room installation renders the inventive inverting filter centrifuge particularly suitable for the processing of highly pure/pharmaceutical products.

34 Claims, 7 Drawing Sheets

U.S. PATENT DOCUMENTS

| | | | | |
|---|---|---|---|---|
| 6,159,360 | A * | 12/2000 | Gerteis et al. | 210/103 |
| 6,408,703 | B1 * | 6/2002 | Gerteis | 73/865 |

FOREIGN PATENT DOCUMENTS

| | | | |
|---|---|---|---|
| JP | 56 065646 | * | 8/1981 |

* cited by examiner

INVERTING-FILTER CENTRIFUGE

The invention relates to an inverting-filter centrifuge comprising a filter drum with radial pass-through openings, which is rotatably supported in a machine frame and projects in a cantilevered manner into a housing that is connected to the machine frame, said filter drum radially enclosing a centrifugal chamber that can be placed under normal pressure, overpressure or underpressure, comprising a centrifugal chamber lid that closes the centrifugal chamber at its face end, comprising a pusher bottom that is rigidly joined to the centrifugal chamber lid while leaving a free space and defining the other side of the centrifugal chamber, wherein the centrifugal chamber is filled from the side, the filter drum and pusher bottom are caused to rotate in unison by means of a rotatably driven hollow shaft and the hollow shaft is firmly connected to the filter drum, an axially displaceable pusher shaft is disposed inside the hollow shaft rotating in unison with it, the filter drum and pusher bottom are moved relative to one another by means of an axial displacement of the pusher shaft in order to turn up the filter cloth and expel separated solids from the centrifugal chamber into a solids collection chamber.

PRIOR ART

All known inverting-filter centrifuges have in common the passage of a feed pipe through the solids collection chamber and continuing on through an opening in the centrifugal chamber lid into the centrifugal chamber, with the requirement that the feed pipe be sealed against the centrifugal chamber by means of rubbing and therefore abrasion-causing seals that result in a contamination of the suspension or solid matter with rubbed-off particles when the centrifugal chamber is placed under overpressure or underpressure.

This results in a gap between the feed pipe and centrifugal chamber lid when work is performed at normal atmosphere, to prevent rubbed-off particles with the shortcoming that splashes or aerosols from the centrifugal chamber can enter through this gap into the solids collection chamber and result in a contamination of the product in the solids collection chamber, either through aging or through rubbed-off particles created when an axial movement is performed.

The feed lines for the media, i.e., for the suspension, wash liquid, and so on, in the known inverting-filter centrifuges takes place through the space located in front of the inverting-filter centrifuge, toward the face end of the inverting-filter centrifuge.

In high-purity productions, the set-up must be such that the processing space with the filter drum projects into a clean room, that the machine frame with the bearing arrangements and all drives is set up in a machine room, that both rooms are separated by a gas-tight, flexible connecting element, and the entire equipment for the media supply is located in the clean room, with the surface of the clean room, including the uneven surface of the media supply equipment, such as, for example, valves, sight glasses, display instruments, lines, being subject to periodic microbiological examinations (so-called “contact-spotting test”). Additionally, the entire clean room must be decontaminated every time the process compartment projecting into the clean room is opened, for example for the periodically required filter cloth change, or for the sporadically required replacement of the centrifugal chamber seal.

In a known inverting-filter centrifuge (DE 37 40 411 C2), a combined rotary and sliding seal are disposed between the stationary feed pipe and the feed opening, allowing operations to be performed in the centrifugal chamber at overpressure or underpressure. The combined rotary and sliding seal that is arranged directly in the pass-through opening of the centrifugal chamber lid has the shortcoming that, due to the unavoidable rubbing of the sealing elements, a significant degree of abrasion occurs in the region of the filter drum, resulting in contaminations of the separated product in the solids collection chamber or filter drum.

In a known inverting-filter centrifuge (DE 39 16 266 C1), the opening in the centrifugal chamber lid is sealed by means of a squeeze valve, or by means of a piston-rod shaped, axially slidable closing element acting from the inside, when work is performed at overpressure or underpressure, and the feed pipe is either decoupled during this time of pressurized gas intake through displacement, or covered by the closing element.

This design has the shortcoming that, during filling of the centrifugal chamber with a suspension or wash liquid, the squeeze valve must be open, or the closing element must be retracted, so that no protection exists against overfill splashes, and also no operations at overpressure or underpressure can take place in the filter drum during this time. Additionally, seals that are not described in the patent document are required both for the axially slidable feed pipe at it’s frontal lead-through through the wall of the solids collection chamber, as well as for the axially slidable closing element at its point of penetration into the shaft. These sealing elements that unavoidably rub because of the axial movement cause rubbed-off particles either in the region of the filter drum or in the region of the solids collection chamber, especially due to the adherence of solid-matter crystals to the outer circumference surface of the feed pipe or closing element, and result in contamination of the filter cake in the filter drum or of the separated product in the solids collection chamber.

In a known inverting-filter centrifuge (EP 0 551 252 B1) the feed pipe is supported rotatable about its longitudial axis and can be caused to rotate in order to reduce the degree of abrasion. The feed pipe and filter drum rotate nearly synchronously so that merely a simple, inflatable membrane is provided as a seal on the centrifugal chamber lid. To drive the rotating feed pipe, a motor is disposed on the extension of the feed pipe.

This design has the shortcoming that an incomplete synchronization between the feed pipe and pass-through opening in the centrifugal chamber lid causes abrasion that results in a contamination of the separated solid matter.

In a known inverting-filter centrifuge (DE 43 37 618 C1), the seal between the feed pipe and rotatable filter drum is implemented by means of a sealing head, which is affixed stationary on an axially slideable feed pipe at the free end of the feed pipe and supported rotatable about it. The sealing head is sealed with respect to the outer circumference of the feed pipe by means of a lip seal and is in non-rotating engagement with the centrifugal chamber lid relative to one another in the sealed state. The sealing head incorporates, along a portion of its axial extension, a conical outer surface whose cone angle is matched to the cone angle of the also conically designed inner circumference surface of the fill opening, so that the conical outer surface and the conical inner circumference surface act together in a sealing manner. Disposed between the conical outer surface and the inner circumference surface is a seal that is implemented as an O-ring. Additional lip seals are disposed between the sealing head and outer circumference of the feed pipe toward the solids collection chamber.

It is a shortcoming of this design that abrading seals result in rubbed-off particles in the separated solid matter. Adhesion of product on the surface of the feed pipe and the performance of the axial movement of the feed pipe cause wear and tear, as well as thermal overstress in temperature-sensitive products. Product deposits on the conical surfaces of the sealing head designed for the sealing function and on the inlet opening cause the formation of a gap, which does not produce the desired sealing function.

In a known inverting-filter centrifuge (DE 197 05 788 C1), the sealing head is firmly connected to the centrifugal chamber lid, but mounted rotating relative to it. Situated within the feed means, which is designed as a rigid feed line with an encompassing mantle tube, is a four-point contact bearing to implement the radial rotary movement, as well as sealing elements toward the centrifugal chamber and solids collection chamber. To seal the axial movement during the inverting process, abrading seals are disposed at the frontal lead-through of the mantle tube through the wall of the solids collection chamber. Disposed on the end of the mantle tube facing the centrifugal chamber, is a conveyor thread in the direction of the centrifugal chamber.

This design has the shortcoming that solid matter depositing on the mantle housing during the performance of the axial movement leads to abrasion and, as a result, to a leakage at the solids collection chamber relative to the environment, and this chamber not being sealed gas-tight. The abrading seals in the sealing head and in the lip seals that are affixed on the mantle tube in the direction of the centrifugal chamber result in rubbed-off particles that contaminate both the suspension, as well as the expelled solid matter.

In a known inverting-filter centrifuge (EP 0 753 349 A2), a sealing head designed to maintain an overpressure in the centrifugal chamber relative to the solids collection chamber is pressed with its conical outer surface against a conical pass-through opening in the centrifugal chamber lid. The axial movement of the feed line is implemented by means of a piston/cylinder unit that penetrates through the front wall of the solids collection chamber. In the sealing head, the elements that rotate in unison with the filter drum are decoupled by means of two mechanical seals regarding their ability to move relative to the elements that are firmly joined to the radially unmovable feed line. The resulting hollow spaces between the mechanical seal and feed line and an installed guide pipe for filling the filter drum with suspension are filled with a seal gas, which may be recirculated in the system.

This design has the shortcoming that abrading seals exist in the region of the solids collection chamber. When the mechanical seal fails, product from both, the centrifugal chamber as well as from the solids collection chamber can enter into the gap of the mechanical seal, so that it can no longer fulfill its function. The closing of the fill opening by means of the sealing head can take place only when the drum is not rotating, so that the possible applications and flexibility of the centrifuge are limited. An additional shortcoming results from the rubbed-off particles resulting at the location of the seal between the feed pipe and solids chamber when the feed pipe is displaced.

In a known, albeit not generic, centrifuge dryer (EP 0 454 045 B1) that has a horizontally mounted drive shaft, a closed drum rotating on the former in unison with it, a filter disposed within the drum that encompasses an operating area, which conically widens from the connecting side of the drive shaft, an axially displaceable diaphragm plate that forms a face end of the process compartment, and a centrifuge housing encapsulating a drum and diaphragm plate, the suspension is fed in through the drive shaft, which is designed as a hollow shaft.

This design has the shortcoming that the actuation unit for the axially slidable diaphragm plate is situated on the side opposite the drive side of the drum and the slidable shaft on which the diaphragm plate is disposed penetrates into the solids area. Through adhesion of product to the surface of the slideable shaft, wear and tear is caused during its axial movement. Furthermore, abrasion is caused at the location of the seal between the rotating diaphragm plate and the radially static, slideable shaft. Since both elements are located in the solid-matter area, both the wear and tear as well as the rubbed-off seal particles contaminate the expelled solid matter.

It is the object of the present invention to improve a generic inverting-filter centrifuge that is operated with pressure/underpressure or at normal atmosphere in the centrifugal chamber in such a way that filling of the media into the centrifugal chamber no longer takes place by means of a feed pipe with its wear-and-tear susceptible and abrasion-causing seals passing through the sensitive solids collection chamber and penetrating the centrifugal chamber lid.

This object is met according to the characteristics of claim 1.

The invention is based on the general inventive idea of introducing the media being entered into the centrifugal chamber, in a generic inverting-filter centrifuge, in contrast to all known designs, not from the face end through the solids collection chamber and centrifugal chamber lid, but via the side facing away from the face end, the pusher bottom and the pusher shaft connected to same.

This conception makes it possible to ensure, by means of a cutout-free centrifugal chamber lid that is permanently closed across its entire surface, that a contamination of the product in the solids collection chamber through splashes and aerosols from the centrifugal chamber or seal abrasion is no longer possible.

This basic concept of the invention, that the previous disadvantageous media supply into the centrifugal chamber by means of a feed pipe with its wear-and-tear susceptible and abrasion-causing seals passing through the sensitive solids collection chamber is moved into the non-sensitive area of the pusher shaft, not only minimizes the rubbed-off particles, but also carries them away without causing any harm and prevents product deposits on the feed pipe.

In the case of highly pure productions and the associated set-up in a clean room and machine room, it is no longer necessary for the entire equipment for the media supply to the inverting-filter centrifuge to be situated in the clean room, thus considerably reducing the amount of work required for the microbiological surface test that must be performed in regular intervals while reducing the size of the clean room, and also of the equipment situated therein.

Additionally, the inventive solution also opens up the possibility of encapsulating the process compartment of the inverting-filter centrifuge with a glove box and changing the filter cloth and centrifugal chamber seal using flexible gloves, with the process compartment closed.

This eliminates the need to open the process compartment for the periodically required filter cloth change and/or to change the centrifugal chamber seal, and thus the complex, costly decontamination of the clean room; the loss of production that has resulted from this up to now is reduced to the rare cases of a serious malfunction or the safety-related inspections that are required in long intervals.

Advantageous embodiments are specified in the subclaims.

BRIEF DESCRIPTION OF THE DRAWINGS

A preferred embodiment of the invention will be explained in greater detail in conjunction with the drawings, in which.

DESCRIPTION OF THE PREFERRED EMBODIMENT

Figure 1:
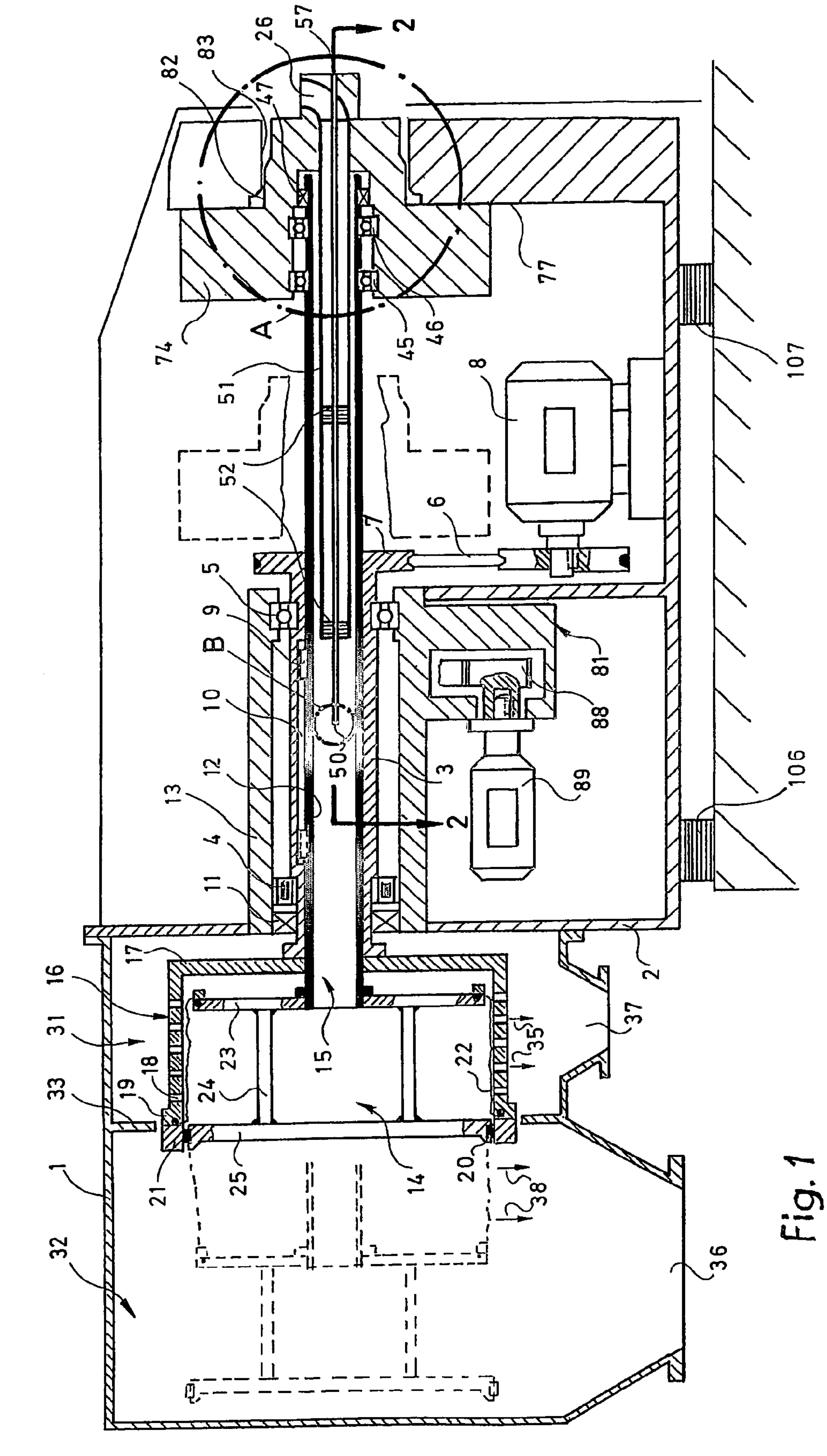
FIG. 1 shows a schematic sectional view of an inverting-filter centrifuge during the operating phase of the centrifuging and, indicated by the broken line, during the operating phase of the solids ejection.

The preferred embodiment of the inverting-filter centrifuge depicted in FIG. 1 comprises a housing 1 that tightly encloses the entire process compartment, said housing 1 being connected to a stationary machine frame 2 in which a hollow shaft 3 is rotatably mounted in main bearings 4, 5. The end of the hollow shaft 3 shown on the right in FIG. 1 that projects beyond the main bearing 5 is connected to a drive wheel 7 integral in rotation therewith, whereby the hollow shaft 3 can be caused to rotate using a V-belt 6, for example, by means of a motor 8.

The hollow shaft 3 rigidly extending between the main bearings 4, 5 incorporates an axially oriented wedge-shaped groove 10, in which a wedge-shaped piece 9 is axially displaceable. This wedge-shaped piece 9 is rigidly joined to a pusher shaft 12 that is displaceable inside the hollow shaft 3. The pusher shaft 12 thus rotates jointly with the hollow shaft 3, but is axially displaceable inside it.

The hollow shaft 3 and the pusher shaft 12 extend inside a support member 13 that is supported on the machine frame 2 and also serves to hold the main bearings 4, 5.

Flanged with its bottom 17 to the end of the hollow shaft 3 located on the left in FIG. 1, which projects beyond the main bearing 4 and radial seal 11, is a filter drum 16, integral in rotation therewith. On its cylindrical outer wall the filter drum 16 has radially extending pass-through openings 18. On its side opposite the bottom 17, the filter drum 16 is open. On the flange-like opening rim 19 surrounding this open face end, the one edge of a substantially cylindrical filter cloth 22 is tightly clamped in. The other edge of the filter cloth 22 is tightly connected to the pusher bottom 23 in an analogous manner, said pusher bottom 23 being rigidly joined to the pusher shaft 13, which freely penetrates through the bottom 17.

At the pusher bottom 23, a centrifugal chamber lid 25 is rigidly attached by means of stay bolts 24 while leaving a free space in-between, said centrifugal chamber lid 25 being depicted in FIG. 1 tightly closing the centrifugal chamber 14 of the filter drum 16 by means of a centrifugal chamber seal 20 and opening together with the pusher bottom 23 the filter drum 16 by axially pushing out the pusher shaft 12 from the hollow shaft 3 (illustrated in FIG. 1 by the broken line).

Provided on the side that is situated on the right in FIG. 1 is an inlet channel 26 that serves to enter a suspension to be broken down into its solid and liquid components, or a wash liquid. The inlet channel 26 is connected via the inlet pipe 51 and via the opening 15 that passes through the entire pusher shaft 12 to the centrifugal chamber 14.

Figure 2:
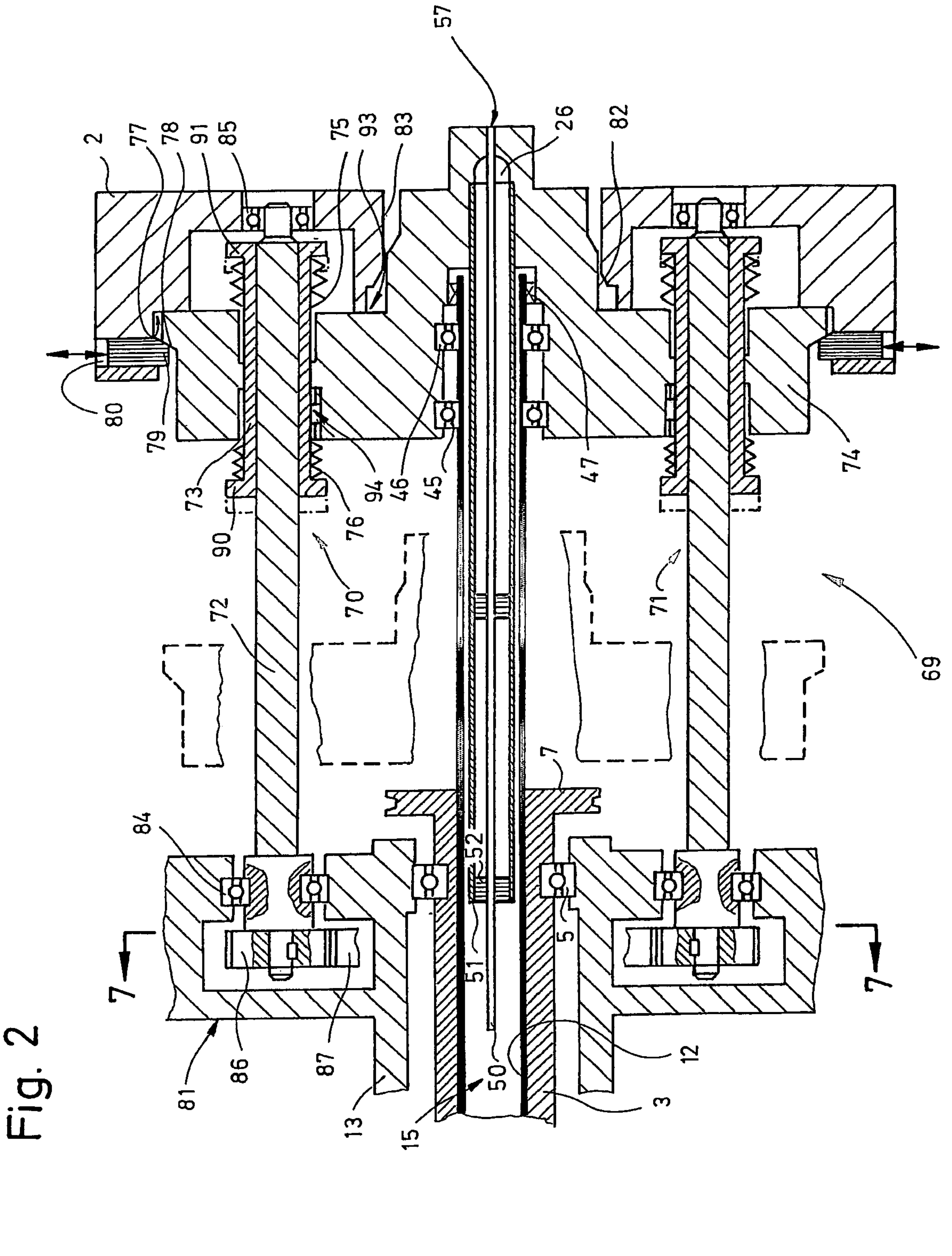
FIG. 2 shows a schematic sectional view along the section line 2—2 in FIG. 1.

A drive means 69 depicted in FIG. 2 comprises, for example, two symmetrically arranged screw spindle shafts 70, 71 that synchronously rotate at the same rotational speed, which cause the axial pushing movement of the pusher plate 74. The drive means will be described below based on one screw spindle shaft, said screw spindle shafts being marked with position numbers only on one side, since they consist of the same machine elements because of the symmetrical arrangement.

The end of the rotatably mounted pusher shaft 12 that is supported by the main bearing 5 is axially connected at the right end via pusher bearings 45 and 46 to a radially rigid pusher plate 74, so that the pusher plate 74 and the pusher shaft 12, as well as all other connected machine elements are jointly displaceable. A threaded spindle 72 is supported on the left side by means of a bearing 84 disposed in the support member 13 and connected rigidly by means of a wedge to a spindle wheel 86, which, as illustrated in FIG. 7, engages by means of intermediate wheels 87 into a drive wheel 88 that is connected directly to the motor 89.

Figure 7:
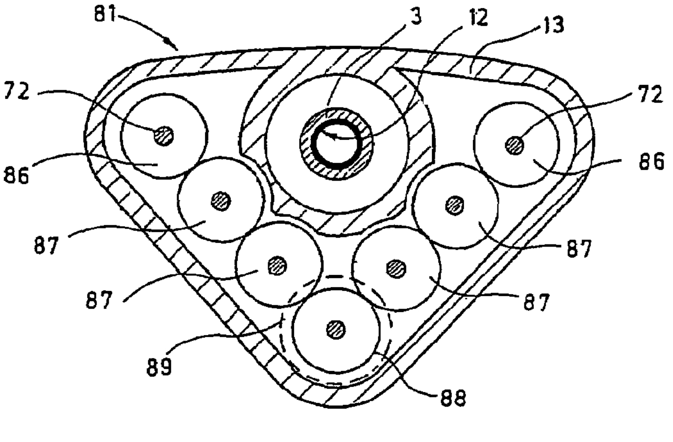
FIG. 7 shows a schematic sectional view along the section line 7—7 in FIG. 2.

As is apparent especially from FIG. 7, the two threaded spindles 72 are frictionally connected to the motor 89 by means of a toothed gearing 81 incorporating the spindle wheels 86, the intermediate wheels 87, and the drive wheel 88.

This example embodiment of a synchronous drive of the two threaded spindles 72 may also be substituted with other known frictional transmission systems, such as chain drives or toothed belt drives.

The threaded spindle 72 is supported on the right side by a bearing 85 that is disposed in the machine frame 2. The exterior thread of the threaded spindle 72 engages into a threaded insert 73 provided with a matching inside thread, which is connected non-rotational but axially slightly displaceable to the pusher plate 74 by means of a conventional pressure-spring connection 94. Arranged between the pusher plate 74 and a face-end collar 90 and 91 protruding at a right angle on the left and right side on the threaded insert 73 is a disk spring 76 and 75, which places the threaded insert 73 under tension relative to the pusher plate 74 in such a way that said pressure-spring connection 94 permits a slight axial movement between the threaded insert 73 and pusher plate 74 to the left or right. The face-end collar 90 and 91 that protrudes at a right angle on both sides of the threaded insert 73 is displaced, in dependence upon the given operating state, either to the right (illustrated by the continuous line) or the face-end collar 90 and 91 is displaced to the left (illustrated by the dot-and-dash line).

The pusher plate 74 is displaced to the right (illustrated in FIGS. 1 and 2 by a continuous line) and rests with a resting surface 93 against an end stop surface 77 of the machine frame 2 and is centered in this position in a reception bore 83 of the machine frame 2 with an annular collar 82 that projects from the resting surface 93. In this operating state the centrifugal chamber lid 25 is sealingly inserted with its centrifugal chamber seal 20 into the holding ring 21 on the rim 19 of the opening of the filter drum 16 and the centrifugal chamber 14 is thus closed.

The pusher plate 74 is connected rigidly and self-locking in this operating state to the machine frame 2 via wedge surfaces 78 by means of a plurality of wedges 79 that are disposed displaceable in grooves 80. The rigid locking of the pusher plate 74 to the machine frame 2 may also be accomplished by means of other known tensioning elements.

Figure 3:
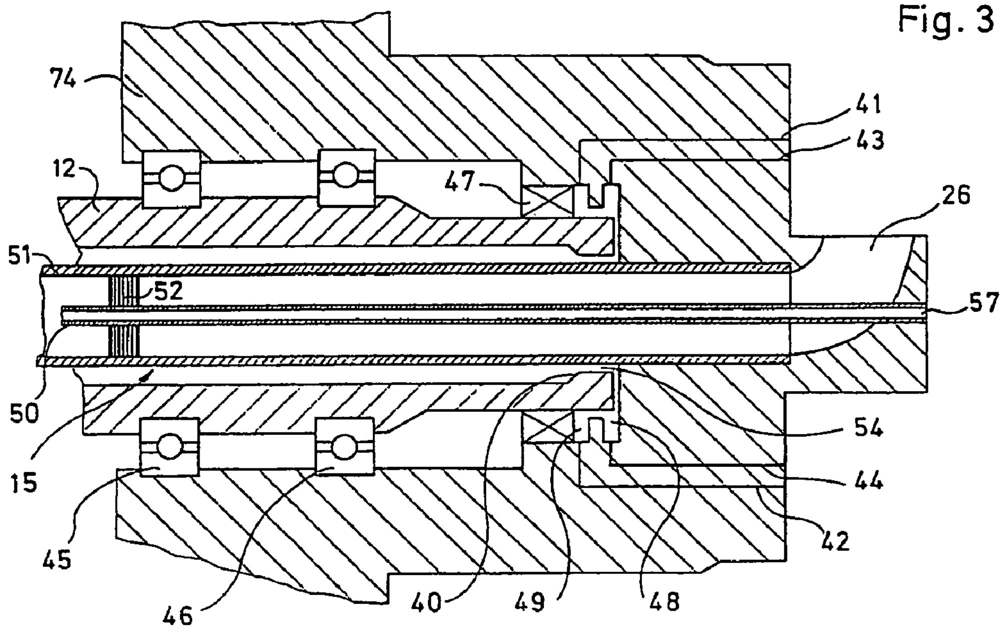
FIG. 3 schematically shows an enlarged partial view in the region of the circle A drawn in a dot-and-dash line in FIG. 1.

As is apparent especially from FIG. 3, the rotatably mounted pusher shaft 12 is axially connected at the right end via the pusher bearings 45 and 46 to the radially rigid pusher plate 74, so that the pusher plate 74 and the pusher shaft 12 are jointly displaceable in the axial direction. A seal 47, preferably a mechanical seal, that is disposed between the pusher shaft 12 and pusher plate 74 has one or more protection zones preceding it.

An embodiment with two protection zones 48 and 49 is shown as an example. The protection zone 48 is connected via a feed line 43 with a not depicted inlet valve, which may optionally be open or closed, to a compressed air source and connected via a gap 54 to the opening 15 of the pusher shaft 12. From the protection zone 48, a drain line 44 leads to a not depicted drain valve, which may optionally be open or closed.

The protection zone 49 is supplied by means of a feed line 41, a not depicted supply valve that may optionally be open or closed, with a liquid suitable for cleaning. From the protection zone 49 a drain line 42 leads to a not depicted drain valve, which may optionally be open or closed. The pusher plate 74 is connected rigidly to the inlet pipe 51 on the right and on the left projects into the opening 15 of the pusher shaft 12. At the right end of the pusher shaft 12 the opening 15 is narrowed by a shoulder 40 to form a smaller passage.

A vent pipe 50 is connected rigidly on the right to the pusher plate 74, passes through the inlet pipe 51 along its entire length and then protrudes into the opening 15. Additionally, the thin, vibration-sensitive vent pipe 50 is supported by means of support struts 52 on the inside wall of the inlet pipe 51. For vibration-related reasons, the inlet pipe 51 with the vent pipe 50 situated in its center, cannot be routed all the way to the centrifugal chamber 14. Depending on the suspension to be filtered it is advantageous, however, to connect the centrifugal chamber 14 directly to a vent connection 57 by means of the vent pipe 50.

Figure 4:
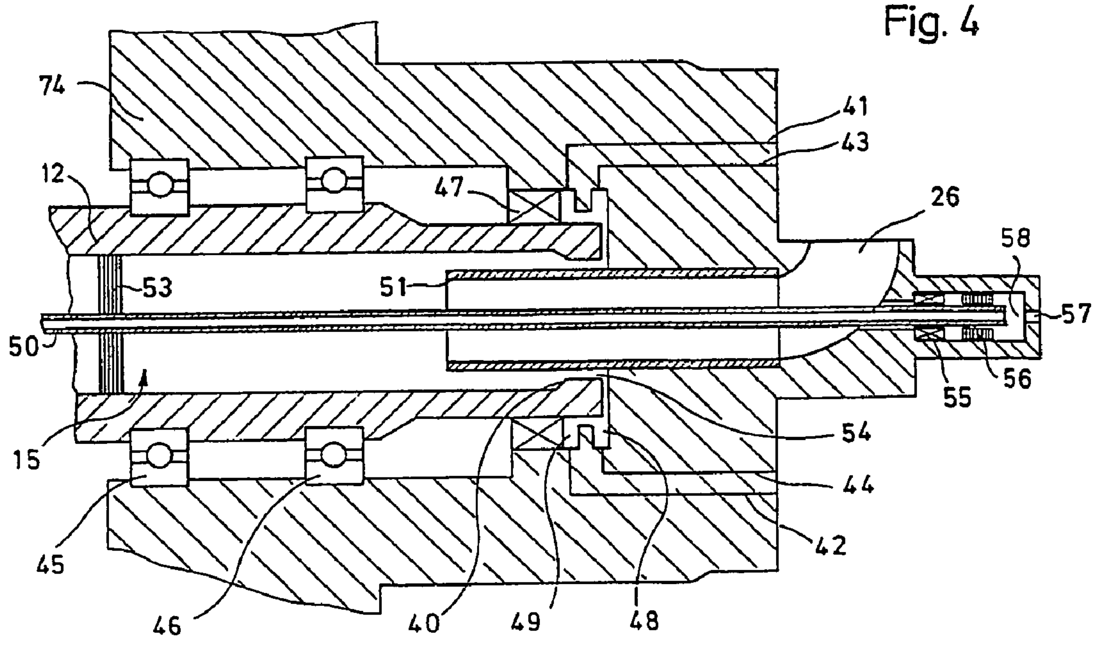
FIGS. 4 and 5 show partial views of example embodiments that have been modified from FIG. 3.

FIG. 4 shows an example embodiment that is more complex than the one in FIG. 3, in which a long vent pipe 50 that passes through the entire opening 15 in the pusher shaft 12 and through the inlet pipe 51, connects the centrifugal chamber 14 via a connecting space 58 directly to the vent connection 57 and to a not depicted valve, which may optionally be open or closed. The vent pipe 50 is supported by means of a plurality of radially and axially distributed support struts 53 on the inside wall of the pusher shaft 12 and rotates in unison with it. At the right end the vent pipe 50 is held by a support 56, a seal ring 55 additionally separates the inlet channel 26 from the connecting space 58.

Figure 5:
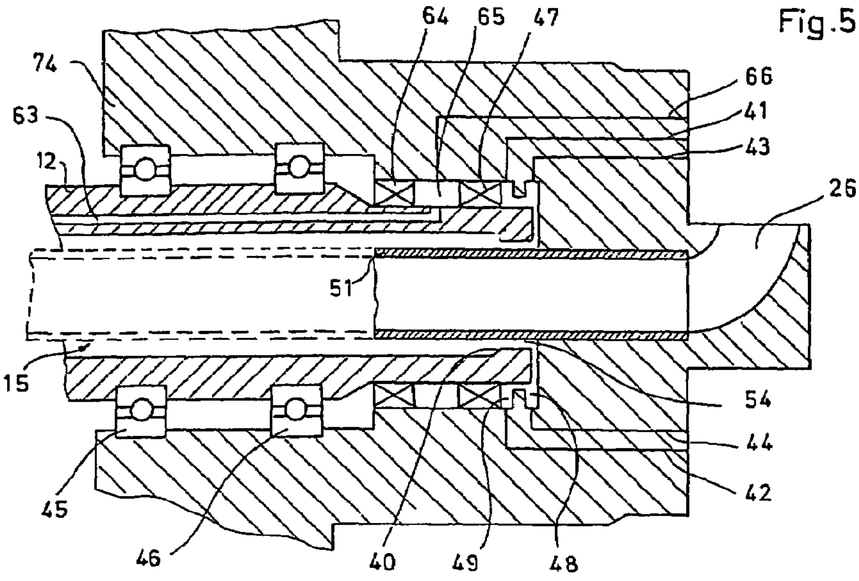

FIG. 5 shows an additional example embodiment that has been modified from FIGS. 3 and 4. An inlet pipe 51 in its shortest embodiment projects beyond the radial shoulder 40 of the pusher shaft in the axial direction only by a short distance and is limited in its longest embodiment (illustrated by the broken line) by vibration-related influences. One or multiple channels 63 in the pusher shaft 12, which create a connection from the centrifugal chamber 14 to the intermediate space 65 that is delimited on the right by the seal 47 and on the left by the shaft seal 64, connect the centrifugal chamber 14 to a vent line 66. The vent line 66 may be open or closed by means of a not depicted valve.

Figure 6:
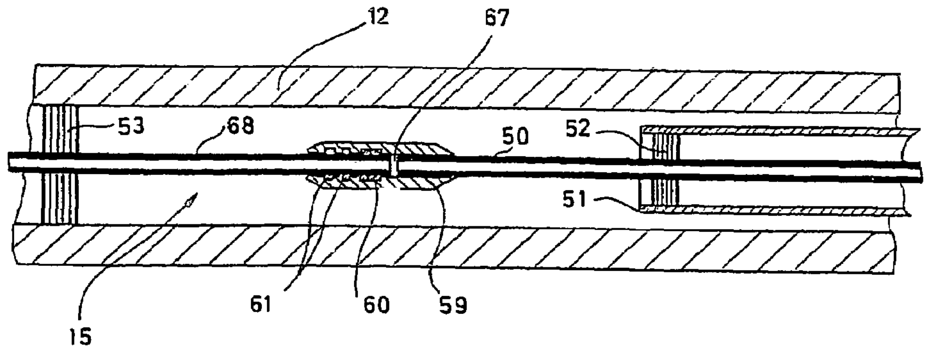
FIG. 6 schematically shows an enlarged partial view in the region of the circle B drawn in a dot-and-dash line in FIG. 1.

FIG. 6 shows a further development of the embodiment shown in FIG. 3. The left end of the static vent pipe 50 is firmly connected to a connecting piece 59 whose bore 67 receives the right end of a vent pipe extension 68 that rotates in unison with the pusher shaft 12 and supports the same with a support 60. The rotating vent pipe extension 68 is sealed by means of a labyrinth 61, or by means of other customary, not depicted sealing systems against a radially static connecting piece 59.

It is apparent in conjunction with FIGS. 1 and 3 that the centrifugal chamber 14 is connected via the vent pipe extension 68 and vent pipe 50 directly to the vent connection 57.

Figure 8:
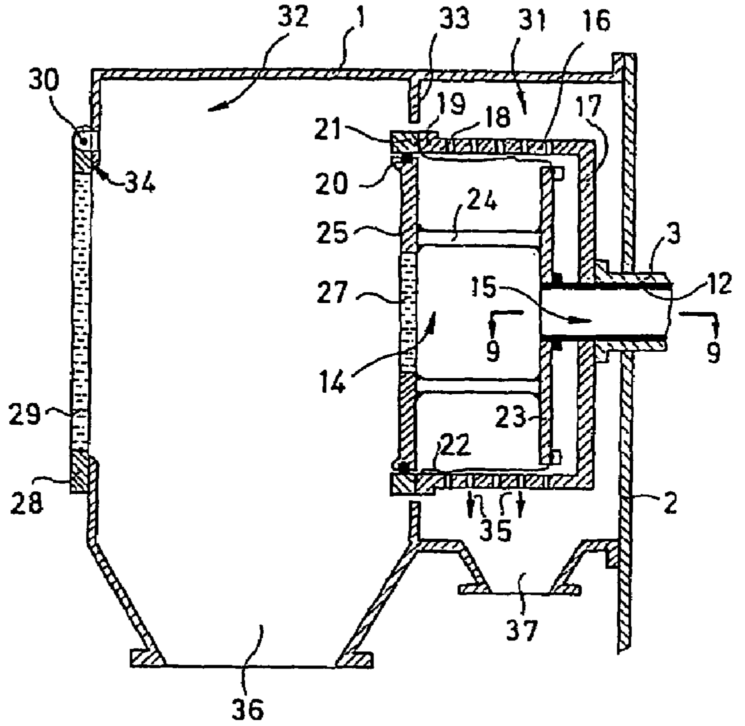
FIG. 8 shows a schematic sectional view of a solids chamber that has been modified from FIG. 1.

FIG. 8 shows an embodiment of the solids collection chamber 32 that has been modified from FIG. 1. The front wall of the housing 1 situated on the left has a large-dimension access opening 34, which is closed by a lid 28. By swiveling the lid 28 about a pin 30, the access opening 34 is released for purposes of inspection and cleaning in the solids collection chamber 32. The lid 28 may be designed see-through in a large area 29, so that the solids collection chamber 32 can be inspected also in its closed state. Additionally, a see-through insert 27 is disposed in the centrifugal chamber lid 25, so that the centrifugal chamber 14 is also viewable from outside when the solids collection chamber 32 is closed.

Figure 9:
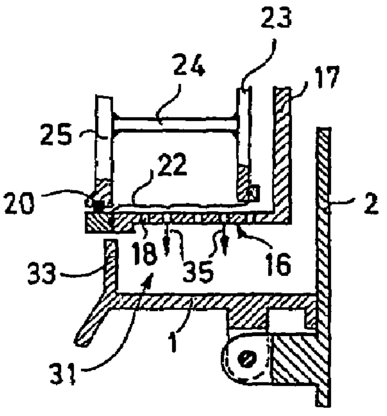
FIG. 9 shows a schematic sectional view along section line 9—9 in FIG. 8.

As can be seen from FIG. 9, the housing 1 is pivotable about a vertical axis 97, which extends through a projection 95 on the housing 1 and a projection 96 on the machine frame 2. The housing 1 can be pivoted to the left into an open position that is not shown, so that a completely unimpeded access is possible to the filter drum 16, solids collection chamber 32, filtrate collection chamber 31 and to a dividing wall 33 separating the two chambers. The housing 1 is connected by means of elements that are known from machine building, for example screw or quick acting closure, to the machine frame 2 under interconnection of a seal.

Figure 10:
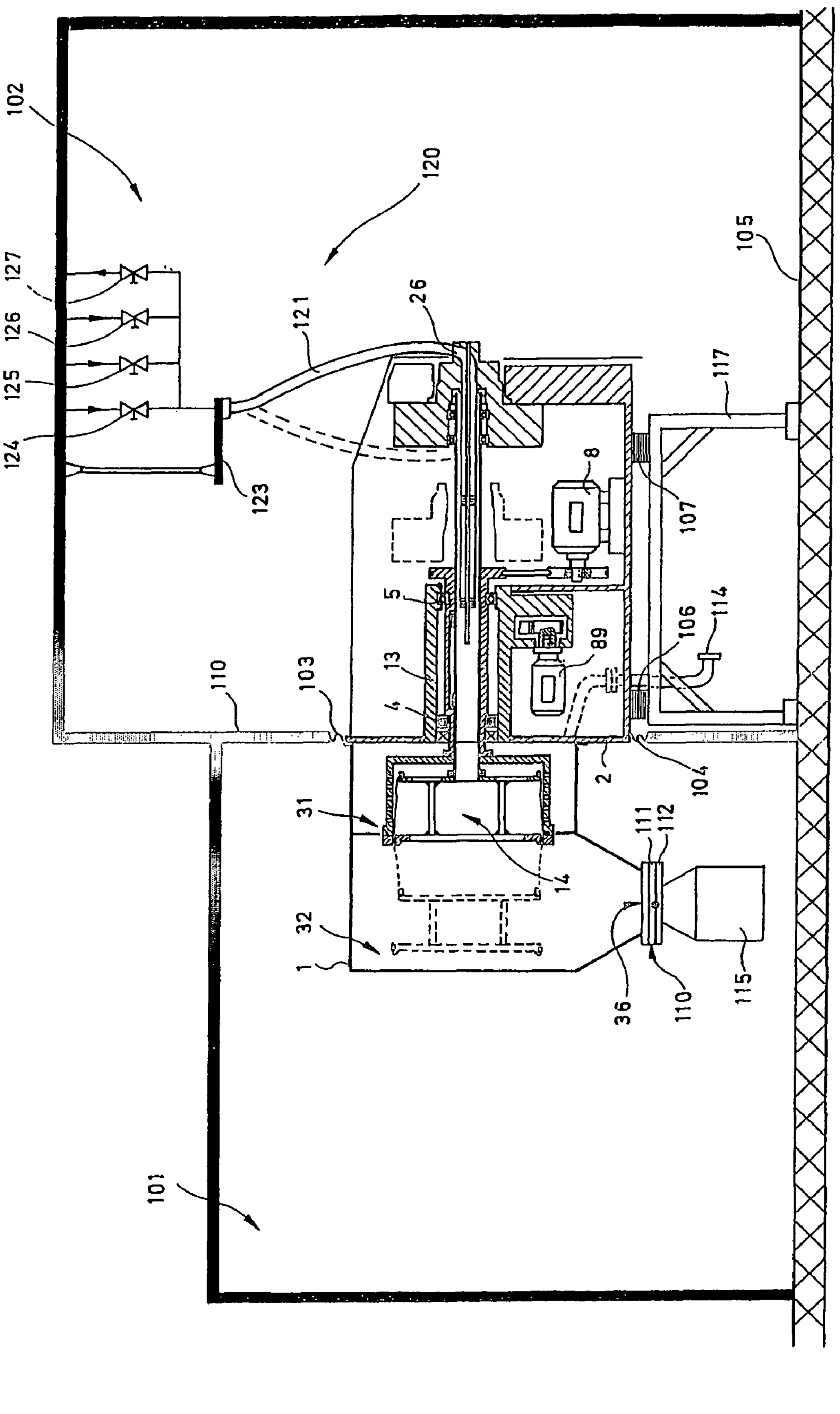
FIG. 10 shows a schematic illustration of the set-up of the inverting-filter centrifuge across two separate rooms.
Figure 11:
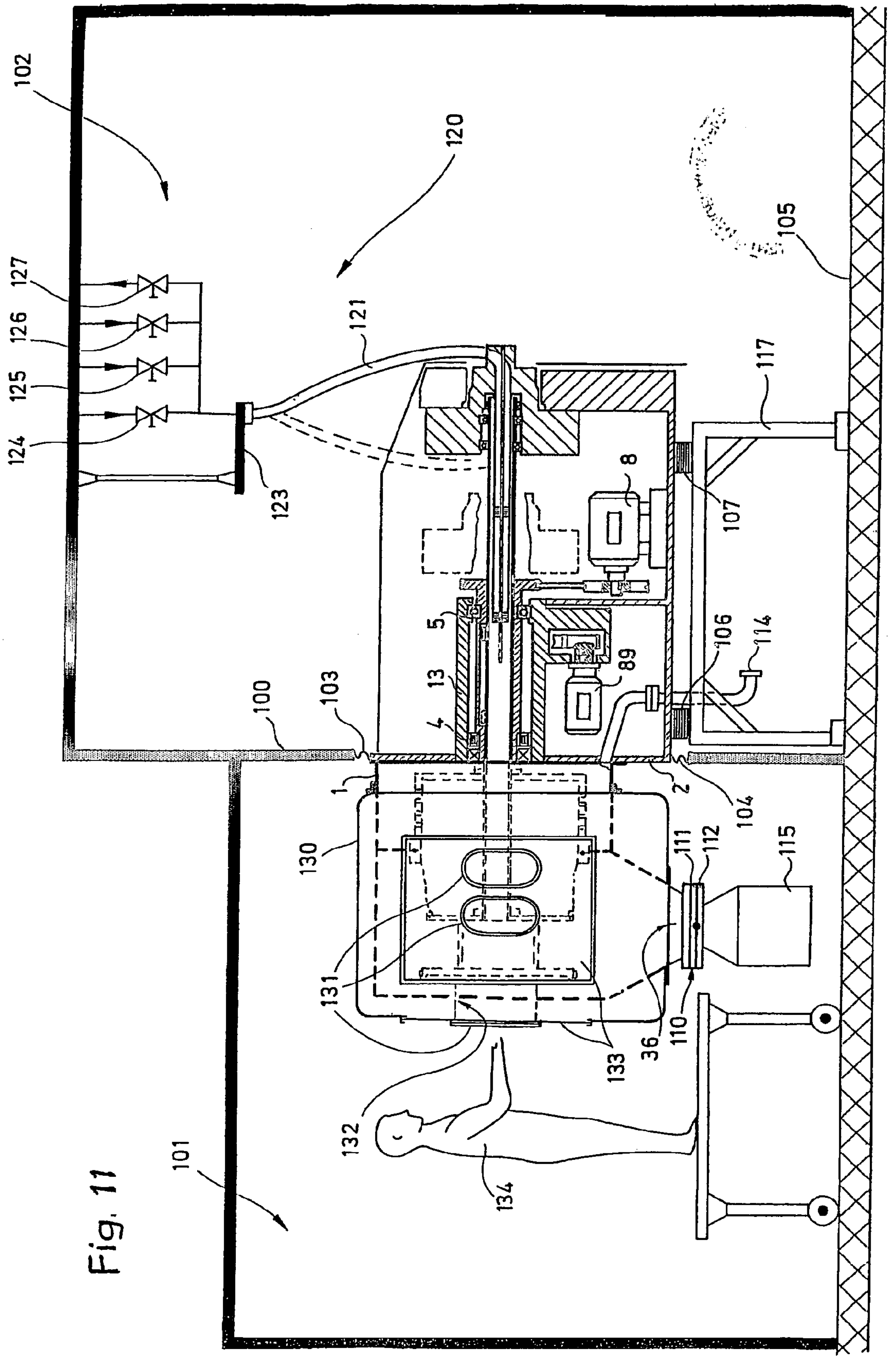
FIG. 11 shows an embodiment of the inventive inverting-filter centrifuge.

The inverting-filter centrifuge depicted in FIGS. 10 and 11 reveals a set-up in which the process compartment encompassed by the housing 1 and comprising the centrifugal chamber 14, filtrate collection chamber 31, and solids collection chamber 32, protrudes through a building divider wall 100 into a clean room 101. A solids discharge opening 36 is connected by means of a separable closing means 110 to a solid-matter container 115, in such a way that in the case of a separation, a closing means top part 111 tightly closes the housing 1 and a closing means bottom part 112 remains on the decoupled solid-matter container 115. The filtrate is transported off through a filtrate discharge line 114 extending from the filtrate collection chamber 31 and passing through the machine frame 2.

It is also apparent from FIGS. 10 and 11 that the machine frame 2 including the components that are connected to it, namely support means 13 with the main bearings 4, 5, translation drive with the motor 89, as well as rotary drive with the motor 8, is fastened under interconnection of elastomeric bearings 106 and 107 on a support stand 117, which, in turn, is anchored to the floor 105 of the machine room 102. The entire media supply equipment 120 is installed in the machine room 102. The translationally moving inlet channel 26 is connected via a flexible tube 121 to a stationary transfer point 123, to which the entire media supply lines are coupled with their associated valves, in the present example embodiment one valve each for the suspension 124, wash liquid 125, compressed gas 126, and ventilation 127.

FIG. 11 shows an example embodiment that has been improved from FIG. 10. The housing 1 projecting into the clean room 101 and enclosing the process compartment of the inverting-filter centrifuge is encompassed, in turn, by a glove box 130. Inserted in the front, rear and face end of the glove box 130 are large-surface viewing panes 133, each of which is provided with multiple openings 131 (two are shown). Worked into the openings 131 by means of mountings are highly flexible gloves 132, whereby an operator 134 can work within the glove box 130 without contaminating the clean room 101.

The housing 1 may be pivoted together with the glove box 130 about the axis 97 shown in FIG. 1. The housing 1 is connected to the machine frame 2 by elements known from machine building, for example screw or quick acting closure, under interconnection of a seal.

During its operation, the inverting-filter centrifuge initially assumes the operating position indicated by the continuous line in FIG. 1. The displaceable pusher shaft 12 is retracted in the hollow shaft 3, causing the pusher bottom 23, which is connected to the pusher shaft 12, to rest in the vicinity of the bottom 17 of the filter drum 16 and the filter cloth 22 being draped into the filter drum 16 in such a way that it is situated in its interior. The centrifugal chamber lid 25, in the process, has sealingly moved with its centrifugal chamber seal 20 into the holding ring 21 on the rim 19 of the opening of the filter drum 16. With the filter drum 16 rotating, the suspension to be filtered is filled through the inlet channel 26, the inlet pipe 51, and the opening 15 in the pusher shaft 12. To provide for a trouble-free filling of the centrifugal chamber 14 when introducing the suspension or wash fluid, the centrifugal chamber 14 is kept non-pressurized by means of the vent pipe 50 and connection 57, which is connected to a valve that is not depicted but open during the filling process. The liquid components of the suspension pass through the pass-through openings 18 of the filter drum 16 in the direction of the arrows 35 and are guided into a filtrate discharge opening 37. The solid particles of the suspension are held back by the filter cloth.

With the filter drum 16 continuing to rotate, the pusher shaft 12 is now displaced to the left (illustrated by the broken line in FIG. 1), causing the filter cloth 22 to be turned up and the solid components adhering to it to be expelled outward in the direction of the arrows 38 into the solids collection chamber 32. From there they can easily be channeled off through the solids discharge opening 36. After completed expelling of the solid particles under the action of the centrifugal force, the filter centrifuge is moved back into its operating state according to FIG. 1 by sliding the pusher shaft 12 back, during which process the filter cloth 22 is inverted back in the opposite direction. In this manner it is possible to operate the centrifuge with a continuously rotating filter drum 16.

The drive means 69 transitions the inverting-filter centrifuge into two operating states. The transition of the two operating states illustrated in FIGS. 1 and 2, namely centrifugal chamber 14 closed (indicated by the continuous line) and centrifugal chamber 14 open (indicated by the broken line), is brought about by the drive means 69.

The axial movement of the pusher plate 74 and of the machine elements connected to it, is brought about, as illustrated in FIGS. 1, 2, and 7, by the motor 89, the toothed gearing 81, and the threaded spindle shafts 70 and 71; depending on the direction of rotation of the motor 89, the pusher plate 74 moves to the right or left and, in the process, is transitioned into one of the two operating states, with the speed of the movement being changeable by adjusting the speed of the motor 89.

Starting from the operating state centrifugal chamber 14 open, pusher plate 74 in left position, depicted in FIGS. 1 and 2 (indicated by the broken line) the pusher plate 74 is moved to the right by turning on the motor until the pusher plate 74 comes to rest with its resting surface 93 against the end stop surface 77 of the machine frame 2. Shortly before this operating state (indicated by the continuous line) is reached, the pusher plate 74 starts to support itself, in this example, with its projecting annular collar 82 in the receptacle bore 83 of the machine frame 2, so that the pusher plate 74 after coming to rest against the machine frame 2, is secured in multiple axes.

In an alternative example embodiment, which is not depicted, the pusher plate 74 is intercepted before it comes to rest against the end stop surface 77 of the machine frame 2, by intercepting pins that project from the machine frame 2 and that penetrate into the matching counterparts provided in it.

In an additional, not depicted example embodiment, the pusher plate 74 is supported along its entire displacement path by means of a sturdy guide means.

After the pusher plate 74 has come to rest against the machine frame 2, the displaceably mounted threaded insert 73 moves, while the threaded spindle 72 continues to rotate, from its left position (indicated in FIG. 2 by the dot-and-dash line) against the pre-tension of the disk spring 76 into the right position (indicated by the continuous line), so that after completion of the rotation, the disk spring 75 disposed between the right face-end collar 91 and threaded insert 73 is relaxed and the pusher plate 74 is pushed by the force of the disk spring 76 against the end-stop surface 77 of the machine frame 2.

The force created by the disk spring 76 is, at the same time, also the maximum locking force for the centrifugal chamber 14. This force is also maintained through the self-locking threaded spindle 72 after the motor 89 is turned off.

In an example embodiment that is not depicted, a protective device that provides a tight seal against the ambient atmosphere, for example an expansion bellows that encompasses the pusher shaft 12 and rotates along with it while permitting the axial displacement, is provided between the hollow shaft 3, or between the drive wheel 7 that is rigidly joined to the hollow shaft 3, and the pusher bearing 45, said protective device preventing, in the case of a germ-free or sterile production, a connection between the processing area inside the housing 1 and the ambient atmosphere.

In an additional, not depicted embodiment, a protective device, for example an expansion bellows, is provided between the pusher plate 74 and the support member 13 on one side and between the pusher plate 74 and the machine frame 2 on the other side, said protective device encompassing the threaded spindle, protecting same against soiling, while permitting the axial movement.

In an additional not depicted example embodiment, the two threaded inserts 73 are arranged not directly in the pusher plate 74 but in a pendulum-type piece is connected, via a swivel axis whose center intersects the center of the pusher shaft, to the pusher plate 74. This arrangement prevents the build-up of different forces in the threaded spindle shafts 70 and 71 by means of a slight pendulum movement of the pendulum-type piece. Additionally, the threaded inserts 73 are integrated into the pusher plate in such a way that they can also perform a slight pendulum movement.

In an additional not depicted example embodiment the threaded spindle is a spindle without self-locking means, for example a conventional circulating ball spindle. In this case the locking force that is required to reliably keep the centrifugal chamber 14 closed is exerted either through the continuously running motor 89 or through a brake that can be switched on at a suitable location in the drive train.

In an additional not depicted example embodiment the threaded spindle shafts 70 and 71 have been replaced with more cost-effective hydraulic lifting cylinders while accepting the shortcomings resulting from the leakage.

In an additional not depicted example embodiment the drive means 69 is implemented on one side with a screw spindle shaft instead of with two screw spindle shafts as depicted in FIG. 2. A shortcoming of this more cost-effective variant is the occurring lateral force that results in increased wear and tear in the translational bearings supporting the displaceable pusher shaft 12.

In an additional not depicted example embodiment the drive means consists of a screw spindle shaft that is centrally disposed in an extension of the pusher shaft 12. This cost-effective embodiment has the shortcoming that the overall length of the inverting-filter centrifuge increases by at least the displacement path of the pusher shaft 12.

In an additional example embodiment of the invention that is depicted in FIG. 2, the pusher plate 74 is tightly connected to the machine frame 2 by means of a releasable locking means which, however, is self-locking in the closed state, which has the advantage that the force required while holding the centrifugal chamber 14 shut is not absorbed by the threaded spindle shafts 70 and 71 but intercepted directly via the pusher plate 74 by the sturdy machine frame 2.

An additional significant advantage of this example embodiment lies in a major improvement of the dynamic behavior of the pusher plate 74 with its vibration-sensitive components, namely seal 47, inlet pipe 51, and vent pipe 50 (depicted in FIGS. 3, 4, 5 and 6) while connected to the machine frame 2. In this example embodiment the inlet pipe 51 and vent pipe 50 can advantageously be implemented with a significantly longer length.

In accordance with the invention, as illustrated in FIG. 1, the centrifugal chamber 14 is closed by inserting the centrifugal chamber lid 25 with its associated centrifugal chamber seal 20, and the positioning in the axial direction takes place through the pusher plate 74 resting tightly against the machine frame 2. The axial force created by the drive means 69 must be at least as great as the axial component of the hydraulic force occurring in the centrifugal chamber 14 under the most unfavorable conditions based on the permitted operating parameters.

The axial component is caused by the difference in surface area between the centrifugal chamber lid 25 and pusher bottom 23 that laterally delimit the centrifugal chamber 14. The maximum component only occurs, however, if at the maximum centrifuge speed and with a full filter drum, a filter cake forms only slowly, which is a rare process that occurs only with suspensions that have a low solids content.

In most cases a solid-matter cake that bridges the difference in surface area between the centrifugal chamber lid 25 and pusher bottom 23 starts to form already at the speed of rotation during filling, which is usually far below the maximum speed of rotation, so that during the subsequent high centrifuging speed of rotation the occurring axial component derived from the hydraulic pressure is marked not only by the flow behavior of the liquid but also by the depositing angle of the solid-matter cake.

Regardless of the axial force generated by the drive means 69, in the inventive embodiment only the force created during opening and closing, as well as the above described force created by the axial component extend over the main bearing 5 and pusher bearings 45, 46, thus resulting in a significantly increased life.

After conclusion of the filtration process, the locking means that connect the pusher plate 74 to the machine frame 2 is released, and by switching on the motor 89 an axial movement of the pusher plate 74 is initiated to the left. As the threaded spindle 72 starts to turn, the displaceably mounted threaded insert 73 in FIG. 2 first starts to move from its position on the right (shown by the continuous line) to the left until the disk spring 75 that is arranged between the face-end collar 91 and threaded insert 73 is under tension and takes the position (illustrated in FIG. 2 by the dot-and-dash line). As the threaded spindle 72 continues to turn, the pusher plate 74 is now moved into its left starting position (shown by the broken line), during which process the centrifugal chamber 14 is opened by means of the pusher shaft 12 connected to it, the filter cloth 22 is turned up, and the solids are expelled into the solids collection chamber 32.

Through the inlet channel 26, inlet pipe 51 and opening 15 in the pusher shaft 12, compressed gas, especially inert gas, can be introduced into the centrifugal chamber 14 of the filter drum 16 after the suspension has been entered. The internal pressure thereby caused in the filter drum 16 increases the hydraulic pressure generated in the centrifugal-force field of the spinning filter drum 16 and, as a result, has an overall favorable effect on the filtration result.

In an additional example embodiment it is also possible to introduce steam through the inlet channel 26 into the filter drum 16 and thus subject the filter cake adhering to the filter cloth 22 to a steam bath. It is also possible to remove an active ingredient from the adhering solid matter by means of extraction. In an additional example embodiment it is also possible to create, instead of an overpressure, an underpressure in the filter drum 16, for example in such a way that the centrifugal chamber 14 is connected via the inlet channel 26 to a suction means, which is not depicted. An underpressure of this type that is temporarily applied may have a favorable effect, for example on the filtration behavior of the filter cake.

When overpressure or underpressure exists in the centrifugal chamber 14, a pressure-tight seal must be created between the static inlet channel 26, the also static inlet pipe 51 and the centrifugal chamber 14. This will be explained in more detail based on FIGS. 1, 3, 4, and 5.

As is apparent from FIG. 3, the radially static pusher plate 74 with its rigidly joined elements inlet pipe 51 and vent pipe 50 is separated from the rotating pusher shaft 12 by the seal 47.

Any type of seal that can be used at this location, be it a gas-lubricated or fluid-lubricated mechanical seal, lip seal, or other known sealing element, has the characteristic feature that, even though it generates rubbed-off particles itself, it reacts very sensitive to deposits of foreign substances, i.e., to soiling at its critical location where the relative movement takes place between the static and rotating components. To maintain the long-term function of the seal 47, measures against soiling are taken according to the invention, it is prevented that foreign substances can deposit on the sensitive area of the seal 47.

The suspension that is entered through the inlet channel 26 is guided through the inlet pipe 51 via the opening 15 in the pusher shaft 12 to the centrifugal chamber 14. Due to the flow behavior of the suspension in the opening 15 in the pusher shaft 12, an even ring of fluid is created that is prevented from spreading further, on the right side, by the shoulder 40 and, as illustrated in FIG. 1, flows off into the centrifugal chamber 14 on the left side.

In other example embodiments that are not shown, the opening 15 in the pusher shaft 12, for example, is not provided with the shoulder 40 depicted in FIG. 3 but is narrowed at its right end and widens over the course of its extension to the other side, so that it opens widened into the centrifugal chamber 14, or the entire machine conception is designed such that the centrifuge axis is inclined toward the centrifugal chamber 14. Embodiments of this kind have the characteristic feature that, after the admission of the suspension or wash liquid is completed, a self-emptying takes place through the opening 15 in the pusher shaft 12.

As can be seen from FIG. 3, the supply of gas into the protection zone 48 creates a seal-gas flow in the gap 54 that separates the radially static inlet pipe 51 from the rotating pusher shaft 12 and thus prevents suspension from entering into the protection zone 48 and 49 preceding the shaft seal 47.

After entering the suspension into the centrifugal chamber 14, wash liquid that is introduced through the inlet channel 26 is passed through the formed solid-matter cake in the centrifugal chamber 14, after a centrifuging time dependent upon the product being processed. The admission of the wash liquid, or only a partial quantity thereof, may also take place via the feed line 43 and can thus simultaneously act as a cleaning liquid for the protection zone 48, the gap 54, and the opening 15 in the pusher shaft 12. The not depicted inlet valve that precedes the feed line 43 in this case is a three-way valve that optionally permits the admission of gas or wash liquid.

By entering cleaning or wash liquid via the feed line 41, subsequent channeling of the same through the protection zone 49 and discharge via the discharge line 42, the generated rubbed-off seal particles, even if these are only smallest quantities depending on the utilized seal, are transported away safely, ensuring that neither the suspension nor the solids will be contaminated.

The vent pipe 50 serves to discharge the gas that is displaced during the filling process in the centrifugal chamber 14, as well as the supplied seal gas, so that the centrifugal chamber 14 that is rendered non-pressurized in this manner can be filled without problem. In individual cases it may be advantageous from an operational point of view, however, to keep the centrifugal chamber 14 under static pressure already during the filling process, which is made possible in such a way that the not depicted valve is preceded by an also not depicted pressure-maintaining valve downstream of the vent connection 57.

Even though the elements pusher plate 74, inlet pipe 51 and vent pipe 50, which have been grouped into one unit according to the invention are rigidly connected to the machine frame 2 during the filling and centrifuging process and, hence, vibration-resistant, the vent pipe 50 can be implemented with a very long length, as illustrated in FIGS. 1 and 3, but due to a lack of stability it does not extend all the way to the centrifugal chamber 14.

Since the vent opening of the vent pipe 50 extends to a point very close to the inlet into the centrifugal chamber 14, this simple, cost-effective arrangement of the vent pipe 50 very often produces satisfactory results.

In FIGS. 4, 5 and 6, in conjunction with FIG. 1 embodiments are shown that are more complex as compared to FIG. 3, in which, however, a direct connection from the rotating centrifugal chamber 14 exists via the connecting space 58 to the radially static vent connection 57, or, as illustrated in FIG. 5, the direct connection leads via the intermediate space 65 to the vent line 66.

In an additional example embodiment that is not shown, channels 63 in the pusher shaft 12 that are illustrated in FIG. 5 are guided from a point located a short distance from its end facing away from the centrifugal chamber 14, for example by means of a pipe, to the center of the pusher shaft and grouped together there in a central pipe which then extends through the inlet pipe 51, the inlet channel 26, to the connecting space 58, which creates a direct connection to the vent connection 57, and a direct connection thus exists from the rotating centrifugal chamber 14 to the radially static vent connection 57.

In all embodiments of the vent, there is a possibility that suspension or solids may be carried off by the escaping gas, and deposits may therefore be caused in the vent pipe 50 or in the channel 63. It is therefore necessary to periodically wash the entire vent system with cleaning or wash liquid. For this purpose the not depicted valve that is provided preceding the vent connection 57 or vent line 66 is implemented as a three-way valve permitting the optional admission of either gas or wash liquid.

The operation of a system that is guided by the idea of preventing to the greatest degree possible the cross-contamination between the product and the environment, is illustrated by the example embodiments in FIGS. 10 and 11, with a split set-up of the inverting-filter centrifuge wherein the process compartment is situated in a clean room 101 and the machine frame 2 with the bearing arrangement, the drives, as well as the entire media supply equipment 120, is situated in a machine room 102.

The inverting-filter centrifuge with its machine frame 2 is set up stationary in the machine room 102 by means of elastomeric bearings 106 and 107 and protrudes with its process compartment through the building divider wall 100, to which it is coupled via flexible, gas-tight connecting elements 103, 104, into the clean room 101. This set-up creates the advantage that when the process compartment of the inverting-filter centrifuge is opened the absolute separation of the two rooms ensures that no contamination of the opened process compartment can take place through the rubbed-off particles generated in the drive portion of the inverting-filter centrifuge whose fine particles are located as aerosols in the entire machine room 102. The elastic installation on the elastomeric bearings 106 and 107, and a coupling to the building wall 100 by means of flexible connecting elements 103 and 104 makes it possible for the strict separation of the two rooms 101 and 102 to be maintained despite the imbalances that are unavoidable in centrifuges, and the resulting self-movement.

The inventive relocation of the entire media supply equipment 120 from the clean room 101 to the machine room 102 eliminates not only the contamination of the product by the rubbed-off particles from the rubbing feed pipe seals that is known in all earlier designs, but it also frees the clean room 101 as well as the solids collection chamber 32 from the media supply equipment 120. This makes it possible, in a configuration of the inverting-filter centrifuge as it is illustrated in FIG. 8, to view the centrifugal chamber 14, which is extremely helpful from a processing point of view. Additionally, it is also apparent from FIGS. 10 and 11 that the relocation of the media supply equipment 120 permits a reduction in size of the clean room 101. The reduction in size of the clean room 101 in combination with the elimination of the media supply equipment 120 drastically reduces the expenditures for the periodically required microbiological inspection of the clean room 101.

Additional advantages of the inventive relocation of the media supply equipment 120 from the clean room 101 to the machine room 102 consist in that the cross-sections of the pass-through openings transporting the media, for example the opening 15 in the pusher shaft 12, can be dimensioned significantly larger than in the previously known embodiments. This allows an increase in the gas throughput if work is performed in the centrifugal chamber 14 at overpressure or underpressure, or if gas is to be passed through the solid-matter cake for drying purposes, which results in an extremely advantageous reduction in the cycle time and, hence, in an increase in production.

Additionally, the large-dimension pass-through openings permit the gas that is displaced in the solids collection chamber during the inversion of the filter cloth 22 to escape through the opening 15 in the pusher shaft 12, the inlet pipe 51 and the inlet channel 26 while preventing a pressure build-up. For this it is helpful to build up an underpressure in the centrifugal chamber 14 before the inversion process is initiated so that when the inversion process starts, the gas to be displaced will immediately flow in the desired direction. Additionally, the space that has been freed up due to the removal of the media supply passage through the solids collection chamber can be utilized otherwise, if needed. For example, a device such as a fill level sensor, microwave transmitter, sampling device or other auxiliary device can be introduced into the centrifugal chamber 14 through the face end of the housing 1, solids collection chamber 32, and centrifugal chamber lid 25 within an enclosure, for example a pipe.

The housing 1 enclosing the process compartment 1 is connected at its solids discharge opening 36 by means of a separable closing means 110 consisting of a top part 111 and bottom part 112 to the solids collection container 115. In the shown coupled state, the solids collection chamber 32 forms a common space with the solid-matter collection container 115 when the flap in the closing means 110 is open, so that, when the filter cloth 22 is turned up, the solids fall through the closing means 110 into the solid-matter container 115. After filling the solid-matter container 115, the flap in the closing means 110 is closed and the closing means 110 is subsequently separated, during which process the housing 1, due to its closing means top part 111 remaining on it, remains closed as gas-tight as the solid-matter container 115 with its closing means bottom part 112 remaining on it. The solid-matter container 115 can now be handled in the closed state and can be transported to its further destination while preventing cross-contamination. An additional, empty solid-matter container 115 will be docked at the separation location. With this method of operation the solids can be removed from the solids collection chamber 32 contamination-free without interruption of the production.

An additional further development of the inventive inverting-filter centrifuge can be seen in FIG. 11. The housing 1 enclosing the process compartment is encompassed, in turn, by a glove box 130. Through openings 131 that are connected to highly flexible gloves, an operator 134 can, through hatches that are not shown, reach into the process compartment by means of gloves 132 in the portion of the housing 1 that is indicated by the broken line. It is thus possible to perform the periodically required change of the filter cloth 22 as well as the sporadically required replacement of the centrifugal chamber seal 20 while the process compartment is closed and thus without decontamination work, since the separation between the process compartment and clean room is not suspended while this work is being performed.

The not depicted hatches in the housing 1 through which the operator 134 reaches into the clean room are provided with covers that are also not depicted, which are designed such that the operator 134 can manipulate them within the glove box 130. The operator 134 can both open and close the hatch, and it is advantageous that the hatch must be closed only dust-tight but not gas-tight since the gas-tight separation between the process compartment and clean room is effected by the glove box.

In an example embodiment that is not depicted, the solid-matter container 115 is not docked to the housing 1 but positioned separately under the solids discharge opening 36. The solid-matter container 115 in this example embodiment is lined with a plastic bag that is closed after receiving the solid matter just like the solid-matter container 115 itself. In order to prevent any cross-contamination while removing the solids from the solids collection chamber 32 and entering them into the solid-matter container 115, the transfer region is also integrated in a glove box.

In an additional example embodiment that is not shown, the solid-matter container 115 is situated in a separate glove box and is moved into the clean room 101 through a lock.

The example embodiment depicted in FIG. 11 and the example embodiments that have been only explained but are not depicted have the characteristic feature that the amount of work that has been reduced by removing the media supply equipment 120 from the clean room 101 is drastically reduced further for the decontamination work required when the housing 1 is opened, since the opening frequency is now reduced to serious malfunctions and to the safety inspections that are required in long intervals. This is an extraordinary advantage, especially when dealing with toxic or carcinogenic substances.

What is claimed is:

1. An inverting-filter centrifuge comprising a filter drum (16) with radial pass-through openings (18), which is rotatably supported in a machine frame (2) and projects in a cantilevered manner into a housing (1) that is connected to the machine frame (2), said filter drum (16) radially enclosing a centrifugal chamber (14) that can be placed under normal pressure, overpressure or underpressure, comprising a centrifugal chamber lid (25) that closes the centrifugal chamber (14) at its face end, comprising a pusher bottom (23) that is rigidly joined to the centrifugal chamber lid (25) while leaving a free space and defining the other side of the centrifugal chamber (14), wherein the centrifugal chamber (14) is filled from the side, the filter drum (16) and pusher bottom (23) are caused to rotate in unison by means of a rotatably driven hollow shaft (3) and the hollow shaft (3) is firmly connected to the filter drum (16), an axially displaceable pusher shaft (12) is disposed inside the hollow shaft (3) rotating in unison with it, the filter drum (16) and pusher bottom (23) are moved relative to one another by means of an axial displacement of the pusher shaft (12) in order to turn up the filter cloth and expel separated solids from the centrifugal chamber (14) into a solids collection chamber (32), characterized in that the centrifugal chamber (14) is closed at its face end by a non-perforated centrifugal chamber lid (25) that is closed across its entire surface, that the pusher bottom (23) defining the centrifugal chamber (14) on the other side is firmly connected to the rotating pusher shaft (12) and that an opening (15) extending through the pusher bottom (23) and opening into the centrifugal chamber (14) passes through the pusher shaft (12) along its entire length to its end facing away from the centrifugal chamber (14) and transitions, via an inlet pipe (51) that is rigidly joined to a radially static pusher plate (74) into an inlet channel (26) that is connected to the pusher plate (74), and a passage is thus created for media to be entered into the centrifugal chamber (14), said passage being sealed against the environment by means of a seal (47) arranged between the rotating pusher shaft (12) and the pusher plate (74) that is axially connected to it.

2. An inverting-filter centrifuge according to claim 1, characterized in that the opening (15) in the pusher shaft (12) is narrowed at its end facing away from the centrifugal chamber (14).

3. An inverting-filter centrifuge according to claim 1, characterized in that the opening (15) in the pusher shaft (12) widens from its end facing away from the centrifugal chamber (14) toward the centrifugal chamber (14).

4. An inverting-filter centrifuge according to claim 1, characterized in that the axis of the pusher shaft (12) with its opening (15) extends downwardly sloping toward the centrifugal chamber.

5. An inverting-filter centrifuge according to claim 1, characterized in that the seal (47) that seals the rotating pusher shaft (12) with its opening (15) against the radially static inlet pipe (51) has protection zones preceding it.

6. An inverting-filter centrifuge according to claim 5, characterized in that a first protection zone (48) is pressurized with gas and the exiting gas creates a seal-gas flow in the gap (54) that separates the radially static inlet pipe (51) from the rotating pusher shaft (12).

7. An inverting-filter centrifuge according to claim 5, characterized in that wash liquid is introduced into a first protection zone (48), said wash liquid flowing off through the gap (54) and the opening (15) in the pusher shaft (12).

8. An inverting-filter centrifuge according to claim 5, characterized in that to clean a second protection zone (49) which is delimited toward the inside by the pusher shaft (12), cleaning or wash liquid is entered and the rubbed-off seal particles that are present in this protection zone (49) are channeled out through a discharge line (42).

9. An inverting-filter centrifuge according to claim 1, characterized in that a vent pipe (50) is provided that passes through the opening (15) in the center of the pusher shaft (12), the inlet pipe (51), and the inlet channel (26).

10. An inverting-filter centrifuge according to claim 9, characterized in that the vent pipe (50) is supported in the inlet pipe (51) and, after the last point of support at the end of the inlet pipe (51) facing the centrifugal chamber (14), projects into the opening (15) of the pusher shaft (12).

11. An inverting-filter centrifuge according to claim 10, characterized in that the vent pipe (50) projecting into the opening (15) of the pusher shaft (12) extends, by means of a connecting piece (59) and a vent pipe extension (68) that is supported on the inside wall of the pusher shaft (12), all the way to the centrifugal chamber (14).

12. An inverting-filter centrifuge according to claim 10, characterized in that the inlet pipe (51) extends as far into the opening (15) of the pusher shaft (12) as possible with respect to vibrations.

13. An inverting-filter centrifuge according to claim 9, characterized in that the vent pipe (50) is supported on the inside wall of the pusher shaft (12) and rotates along with it.

14. An inverting-filter centrifuge according to claim 13, characterized in that the vent pipe (50) that rotates with the pusher shaft (12) projects at one end into the centrifugal chamber (14) and is connected at the other end via a connecting space (58) to a radially static vent connection (57).

15. An inverting-filter centrifuge according to claim 1, characterized in that one or multiple channels (63) in the pusher shaft (12) create a vent connection between the rotating centrifugal chamber (14) and a radially static vent line (66).

16. An inverting-filter centrifuge according to claim 1, characterized in that one or multiple channels (63) in the pusher shaft (12) are guided from a point located a short distance from the end of the pusher shaft (12) facing away from the centrifugal chamber (14) to the center and are connected from there by a common vent pipe via the connecting space (58) to a radially static vent connection (57).

17. An inverting-filter centrifuge according to claim 1, characterized in that a drive means (69) moves the pusher plate (74) after completion of its drum closing movement against an end-stop surface (77) on the machine frame (2).

18. An inverting-filter centrifuge according to claims 1 or 17, characterized in that a threaded spindle (72) presses, by means of a spring (76), the pusher plate (74) with the rigidly joined inlet pipe (51) against the machine frame (2).

19. An inverting-filter centrifuge according to claims 1 or 17, characterized in that the pusher plate (74) is locked firmly but removably to the machine frame (2).

20. An inverting-filter centrifuge according to claims 19, characterized in that the locking means is designed self-locking.

21. An inverting-filter centrifuge according to claims 1 or 17, characterized in that the pusher plate (74) is secured on the machine frame (2) by means of additional support means in multiple axes.

22. An inverting-filter centrifuge according to claims 1 or 17, characterized in that only the axial component of the hydraulic force occurring in the centrifugal chamber (14), as well as the force needed for opening and closing the centrifugal chamber, needs to be absorbed as an axial force by the pusher bearings (45, 46) connected to the pusher shaft (17) and by the main bearing (5).

23. An inverting-filter centrifuge according to claim 1, characterized in that between a hollow shaft (3), or the drive wheel (7) that is rigidly connected to the hollow shaft (3), and a pusher bearing (45) a protective means that tightly seals against the ambient atmosphere is provided that encompasses the pusher shaft (12) and rotates with it while permitting the axial displacement.

24. An inverting-filter centrifuge according to claim 1, characterized in that through the opening (15) in the pusher shaft (12) as well as through the inlet pipe (51) and the inlet channel (26) a gas flow is guided for an overpressure or underpressure to be created in the centrifugal chamber (14), as well as to release them.

25. An inverting-filter centrifuge according to claim 1, characterized in that the face end of the solids collection chamber (32) is designed free of openings.

26. An inverting-filter centrifuge according to claim 1, characterized in that the solids collection chamber (32) is free of traversing components that serve to fill the centrifugal chamber (14) with media.

27. An inverting-filter centrifuge according to claim 26, characterized in that a central insert (27) in the centrifugal chamber lid (25) and/or a large area (29) at the face end of the housing (1) is designed see-through so that the centrifugal chamber (14) can be viewed from outside even with the housing (1) closed and the filter drum (16) rotating.

28. An inverting-filter centrifuge according to claim 1 or 26, characterized in that by creating a connection between the centrifugal chamber (14), passing through the solids collection chamber, to the front wall of the housing (1), devices are introduced into the centrifugal chamber (14).

29. An inverting-filter centrifuge according to claim 1, characterized in that in the solids collection chamber (32) and in the centrifugal chamber (14) no abrasion-producing radial seals are present.

30. An inverting-filter centrifuge according to claim 1, characterized in that by relocating the media supply equipment (120) and the resulting elimination in a clean room (101) enclosing the process compartment of the inverting-filter centrifuge, the former is designed considerably smaller and easier to clean.

31. An inverting-filter centrifuge according to claim 1, characterized in that the housing (1) enclosing the process compartment is encompassed by a glove box (130) that incorporates at least one viewing pane.

32. An inverting-filter centrifuge according to claim 31, characterized in that openings (131) with flexible gloves (132) and hatches in the housing (1) are provided in the glove box (130), through which it is possible to reach into the process compartment without opening the housing (1) enclosing the process compartment.

33. An inverting-filter centrifuge according to any of claims 31 or 32, characterized in that the housing (1) is designed to pivot together with the glove box (130) when the process compartment is opened.

34. An inverting-filter centrifuge according to claim 1, characterized in that the medium to be introduced into the centrifugal chamber (14) is liquid, solid, gaseous or any random combination of these aggregate states.

* * * * *